(12) United States Patent
Ushijima et al.

(10) Patent No.: US 12,211,281 B2
(45) Date of Patent: Jan. 28, 2025

(54) NON-TRANSITORY COMPUTER-READABLE RECORDING MEDIUM, NOTIFICATION METHOD, AND INFORMATION PROCESSING DEVICE

(71) Applicant: FUJITSU LIMITED, Kawasaki (JP)

(72) Inventors: Satoru Ushijima, Kawasaki (JP); Ryo Ishida, Kawasaki (JP); Yasuhiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 187 days.

(21) Appl. No.: 17/853,926

(22) Filed: Jun. 30, 2022

(65) Prior Publication Data
US 2023/0100920 A1 Mar. 30, 2023

(30) Foreign Application Priority Data
Sep. 30, 2021 (JP) ................. 2021-160782

(51) Int. Cl.
*G06V 20/52* (2022.01)
*G06Q 20/20* (2012.01)
*G07G 1/00* (2006.01)
*G07G 1/14* (2006.01)

(52) U.S. Cl.
CPC .......... *G06V 20/52* (2022.01); *G06Q 20/208* (2013.01); *G07G 1/0018* (2013.01); *G07G 1/14* (2013.01)

(58) Field of Classification Search
CPC ........ G06V 20/52; G06V 10/14; G06V 40/20; G06Q 20/208; G06Q 20/4016; G06Q 20/18; G07G 1/0018; G07G 1/14; G07G 1/0045; G07G 1/12; G07G 1/0054; G07G 1/0036;
(Continued)

(56) References Cited

U.S. PATENT DOCUMENTS

| | | | |
|---|---|---|---|
| 7,631,808 B2 * | 12/2009 | Kundu | G06V 20/41 |
| | | | 235/383 |
| 9,886,827 B2 * | 2/2018 | Schoner | G06V 20/52 |
| 9,886,927 B2 | 2/2018 | Cao | |

(Continued)

FOREIGN PATENT DOCUMENTS

| | | |
|---|---|---|
| JP | 5054670 B2 | 10/2012 |
| JP | 2020-53019 A | 4/2020 |
| WO | 2006/105376 A2 | 10/2006 |

OTHER PUBLICATIONS

Extended European Search Report issued Dec. 13, 2022, in corresponding European Patent Application No. 22183034.2.

(Continued)

*Primary Examiner* — Jared Walker
(74) *Attorney, Agent, or Firm* — XSENSUS LLP

(57) ABSTRACT

An information processing device identifies a first feature amount related to the number of the product registered on the specific machine based on an acquired product information, generating, from an image capturing a user in front of the specific machine, a first area information, a second area information and an interaction between the first class and the second class, specifies an action of the user of registering the product to the specific machine based on the first area information, the second area information, and the interaction, identifies a second feature amount related to the number of time of carrying out the action; and generates an alert based on the first feature amount and the second feature amount.

12 Claims, 13 Drawing Sheets

(58) Field of Classification Search
CPC .............. G07G 1/0063; G07G 3/003; G06T 2207/30242
See application file for complete search history.

(56) References Cited

U.S. PATENT DOCUMENTS

| | | | |
|---|---|---|---|
| 10,192,136 B2 * | 1/2019 | Sawada | G06V 20/00 |
| 10,282,720 B1 * | 5/2019 | Buibas | G06Q 20/40 |
| 2012/0043375 A1 * | 2/2012 | Ueda | G06Q 20/208 |
| | | | 235/3 |
| 2016/0203499 A1 * | 7/2016 | Yamashita | G06V 20/52 |
| | | | 705/7.29 |
| 2017/0228989 A1 * | 8/2017 | Sekine | H04N 23/635 |
| 2018/0096567 A1 * | 4/2018 | Farrow | G06V 40/161 |
| 2018/0204200 A1 * | 7/2018 | Kakino | G06Q 20/208 |
| 2020/0020112 A1 | 1/2020 | Buibas et al. | |
| 2020/0020113 A1 * | 1/2020 | Buibas | G06Q 30/06 |
| 2020/0027218 A1 | 1/2020 | Buibas et al. | |
| 2021/0217017 A1 * | 7/2021 | Scott | G06V 20/52 |
| 2021/0241356 A1 * | 8/2021 | Masuda | G06V 20/52 |
| 2021/0312422 A1 * | 10/2021 | Lee | G06V 20/52 |
| 2021/0357896 A1 * | 11/2021 | Masuda | G06T 7/20 |
| 2021/0400195 A1 * | 12/2021 | Adato | G08B 13/19632 |
| 2022/0414632 A1 * | 12/2022 | O'Herlihy | G07G 1/0063 |

OTHER PUBLICATIONS

Office Action issued on Jun. 7, 2024, in corresponding Korean patent Application No. 10-2022-0082340, 10 pages.

\* cited by examiner

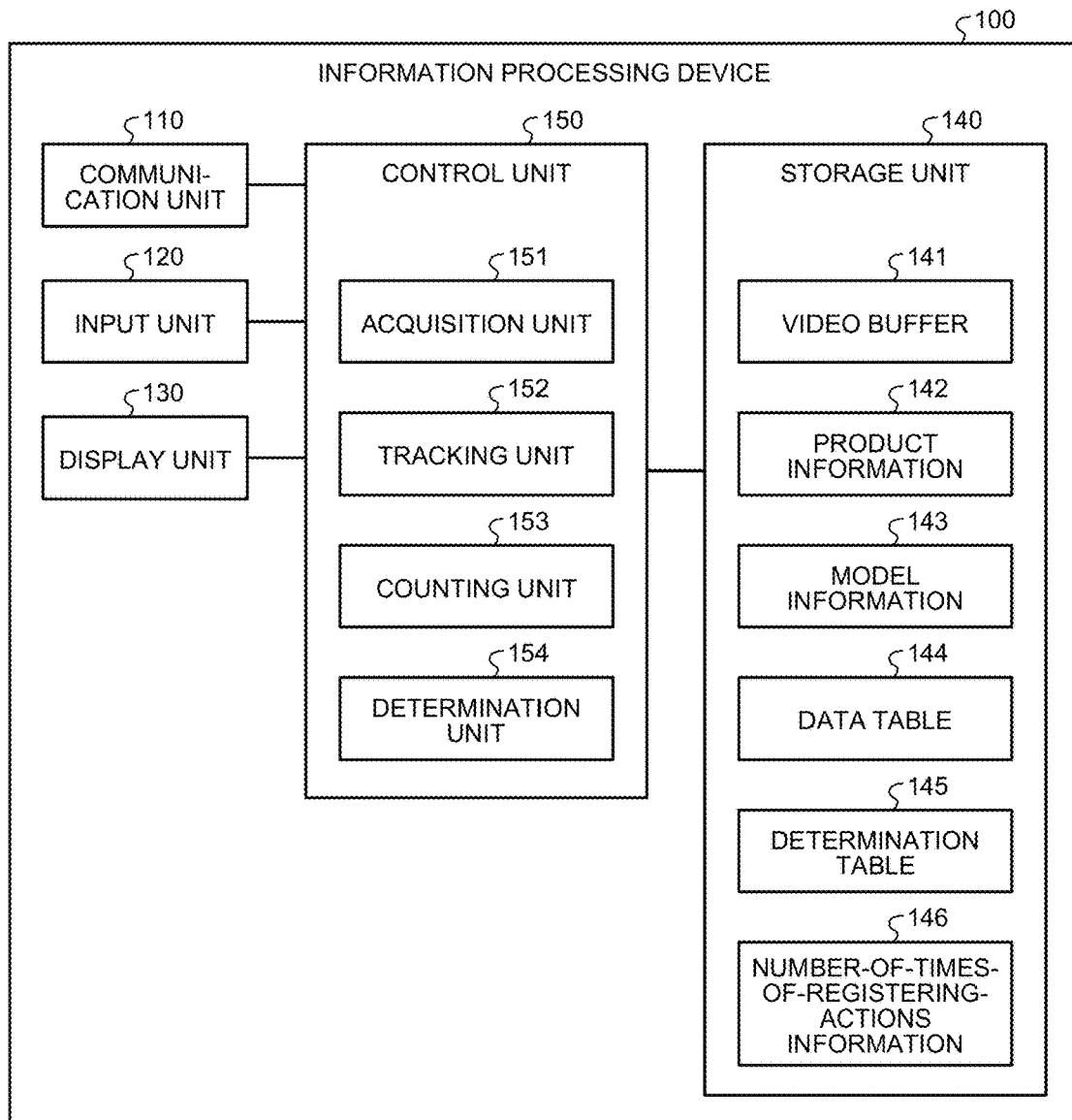

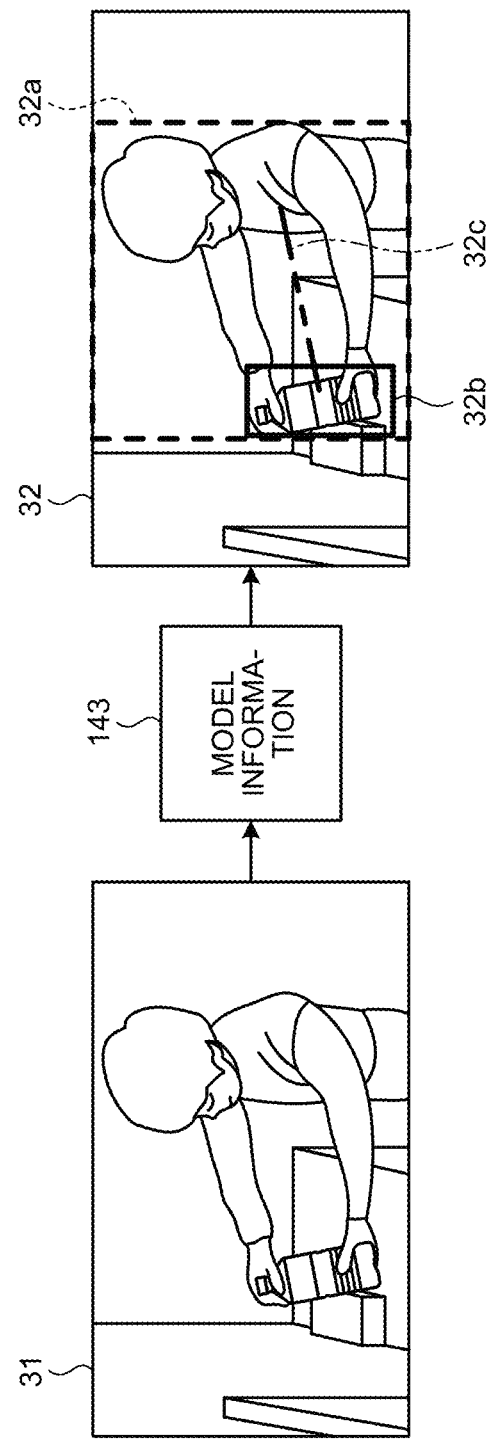

DETECTION RESULT TABLE 144a

| PRODUCT REGION COORDINATES |
|---|
| [100, 100, 110, 110] |
| [500, 500, 510, 510] |

BEING-TRACKED-OBJECT TABLE 144b

| ID | PRODUCT REGION COORDINATES | LOST COUNT | STAY COUNT |
|---|---|---|---|
| 1 | [110, 110, 120, 120] | 0 | 5 |
| 3 | [190, 190, 200, 200] | 2 | 1 |

TRACKING-STOPPED-OBJECT TABLE 144c

| ID | PRODUCT REGION COORDINATES | FLAG |
|---|---|---|
| 2 | [410, 410, 420, 420] | false |

| ID | PREVIOUS FRAME POSITION | COUNTED FLAG |
|---|---|---|
| 1 | OUT | false |
| 3 | OUT | false | ns
NON-TRANSITORY COMPUTER-READABLE RECORDING MEDIUM, NOTIFICATION METHOD, AND INFORMATION PROCESSING DEVICE

CROSS-REFERENCE TO RELATED APPLICATION(S)

This application is based upon and claims the benefit of priority of the prior Japanese Patent Application No. 2021-160782, filed on Sep. 30, 2021, the entire contents of which are incorporated herein by reference.

FIELD

The embodiment discussed herein is related to a non-transitory computer-readable recording medium, etc.

BACKGROUND

Self-checkout machines have become common in shops such as supermarkets and convenience stores. A self-checkout machine is a Point of Sale (POS) checkout system with which a user who purchases products carries out a process of reading barcodes of the products and checking out by himself/herself. For example, by introducing the self-checkout machine, labor cost can be lowered, and checkout mistakes caused by store employees can be prevented.

On the other hand, a self-checkout machine is desired to detect fraud of users such as an act of not reading barcodes. For this problem, for example, there is a conventional technique which analyzes image data from a camera, tracks a person in a shop, and specifies the timing at which the person being tracked picks up or moves a product. By using this conventional technique, whether the user has carried out a barcode reading action or not can be automatically determined.

FIG. 17 is a diagram for describing a conventional technique. In the example illustrated in FIG. 17, when image data 10 is input, a region 10a of a self-checkout machine is detected, and a scan region 10b of the self-checkout machine is detected. In the conventional technique, a region 10c of a product held by the user is detected, and, when the detected region 10c of the product enters the scan region 10b, it is determined that the user has carried out an action of reading a barcode.

Patent Document 1: Japanese Laid-open Patent Publication No. 2020-53019

However, the above described conventional technique has a problem that it is not possible to detect missed checkout of products.

In FIG. 17, there are users who have moved a product to be purchased to the scan region 10b of the self-checkout machine, but does not notice barcode reading failure and users who pretend to carry out barcode reading in the scan region 10b. For example, if a user moves a barcode to the scan region 10b and then pretends to carry out barcode reading, the conventional technique determines that a barcode reading action has been carried out.

SUMMARY

According to an aspect of an embodiment, a non-transitory computer-readable recording medium has stored therein a program that causes a computer to execute a process including acquiring product information registered on a specific machine which reads a code of a product; identifying a first feature amount related to the number of the product registered on the specific machine based on the acquired product information; generating, from an image capturing a user in front of the specific machine, a first area information in which a first class indicating a user who purchased the product and an area where the user appears are associated, a second area information in which a second class indicating an object including a product and an area where object appears are associated, and an interaction between the first class and the second class; specifying an action of the user of registering the product to the specific machine based on the first area information, the second area information, and the interaction; identifying a second feature amount related to the number of time of carrying out the action; and generating an alert based on the first feature amount and the second feature amount.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a functional block diagram illustrating a configuration of an information processing device according to the present embodiment;

FIG. 3 is a diagram illustrating an example of a data structure of product information;

FIG. 4 is a diagram for describing model information;

FIG. 5 is a diagram illustrating an example of a data structure of a data table;

FIG. 6 is a diagram illustrating an example of a data structure of a determination table;

DESCRIPTION OF EMBODIMENTS

Preferred embodiments of the present invention will be explained with reference to accompanying drawings. Note that this invention is not limited by the embodiments.

Figure 1:
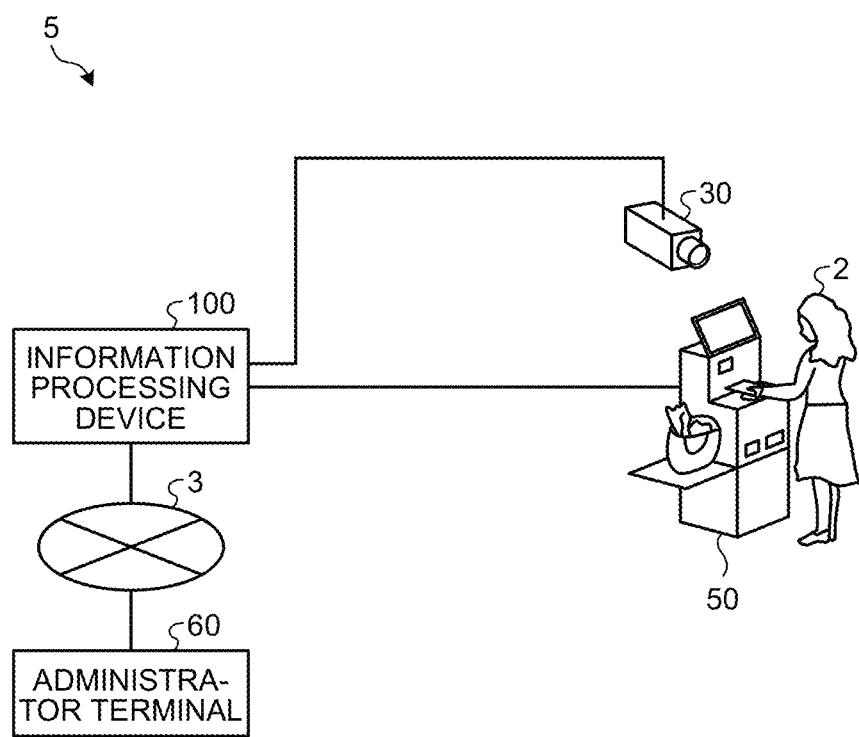
FIG. 1 is a diagram illustrating an example of a system according to the present embodiment.

FIG. 1 is a diagram illustrating an example of a system according to the present embodiment. As illustrated in FIG. 1, this system 5 has a camera 30, a self-checkout machine 50, an administrator terminal 60, and an information processing device 100.

The information processing device 100 is connected to the camera 30 and the self-checkout machine 50. The information processing device 100 is connected to the administrator terminal 60 via a network 3. The camera 30 and the self-checkout machine 50 may be connected to the information processing device 100 via the network 3.

The camera 30 is a camera which captures a video of a region including the self-checkout machine 50. The camera 30 transmits data of the video to the information processing device 100. In the following descriptions, the data of the video will be described as "video data".

The video data includes plural image frames in time series. Frame numbers are given to the image frames in the ascending order of time series. One image frame is a still image captured at certain timing by the camera 30.

The self-checkout machine 50 is a POS checkout system with which a user 2 who purchases products carries out a process of reading barcodes of products and checking out. For example, when the user 2 moves a product to be purchased to a scan region of the self-checkout machine 50, the self-checkout machine 50 scans a barcode of the product.

The user 2 repeatedly executes the above described action, and, when scanning of products is completed, the user 2 operates a touch screen or the like of the self-checkout machine 50 to request checkout. When the checkout request is received, the self-checkout machine 50 presents the number of the products to be purchased, a purchase amount, etc. and executes a checkout process. The self-checkout machine 50 stores, in a storage unit, the information of the products which have been scanned since the user 2 has started scanning until the checkout request is made, and the self-checkout machine 50 transmits the information to the information processing device 100 as product information.

The administrator terminal 60 is a terminal device used by an administrator of a shop. The administrator terminal 60 receives, for example, a notification of an alert from the information processing device 100.

The information processing device 100 is a device which notifies the administrator terminal 60 of an alert based on the number of times that the user 2 has carried out an action of registering a product to the self-checkout machine 50, which is specified from the video data acquired from the camera 30, and based on the number of purchases of products specified from the product information. In the following descriptions, the number of times that the user 2 has carried out the action of registering a product to the self-checkout machine 50 is described as "number of times of registering actions".

For example, if the number of times of registering actions and the number of purchases are different from each other, it can be said that missed checkout of the product(s) has occurred. Therefore, the missed checkout of the product(s) can be detected by giving an alert by the information processing device 100 based on the number of times of registering actions and the number of purchases.

Next, an example of a configuration of the information processing device 100 illustrated in FIG. 1 will be described. FIG. 2 is a functional block diagram illustrating a configuration of an information processing device according to the present embodiment. As illustrated in FIG. 2, the information processing device 100 has a communication unit 110, an input unit 120, a display unit 130, a storage unit 140, and a control unit 150.

The communication unit 110 executes data communication between the camera 30, the self-checkout machine 50, the administrator terminal 60, etc. For example, the communication unit 110 receives the video data from the camera 30. The communication unit 110 receives the product information from the self-checkout machine 50.

The input unit 120 is an input device which inputs various information to the information processing device 100. The input unit 120 corresponds to a keyboard, a mouse, a touch screen and/or the like.

The display unit 130 is a display device which displays the information output from the control unit 150. The display unit 130 corresponds to a liquid crystal display, an organic electro luminescence (EL) display, a touch screen, and/or the like.

The storage unit 140 has a video buffer 141, a product information 142, model information 143, a data table 144, a determination table 145, and number-of-times-of-registering-actions information 146. The storage unit 140 is realized, for example, by a semiconductor memory element such as a random access memory (RAM) or a flash memory, or by a storage device such as a hard disk or an optical disk.

The video buffer 141 stores the video data captured by the camera 30. The video data includes plural image frames in time series.

The product information 142 is the information acquired from the self-checkout machine 50 and has the information of the products which have been scanned after the user 2 has started scanning until the checkout request is made. FIG. 3 is a diagram illustrating an example of a data structure of the product information. As illustrated in FIG. 3, the product information 142 associates time/date information with product identification information.

The time/date information represents time and date when the barcode of the product is read by the self-checkout machine 50. The product identification information is the information which uniquely identifies products. For example, a first row of FIG. 3 represents a fact that a barcode of a product having product identification information "item101" has been scanned at time and date of "10 o'clock 13 minutes 30 seconds on Sep. 10, 2021".

The model information 143 is a neural network (NN) which outputs information related to interactions between users (persons) and products (things) when the image frames are input. For example, the model information 143 corresponds to human object interaction detection (HOID).

FIG. 4 is a diagram for describing the model information. As illustrated in FIG. 4, when an image frame 31 is input to the model information 143, detection information 32 is output. The detection information 32 includes user region information 32a, product region information 32b, and interaction information 32c.

The user region information 32a represents the region of the user included in the image frame 31 by coordinates (x, y coordinates in the top left, x, y coordinates in the bottom right). The product region information 32b represents the region of the product included in the image frame 31 by coordinates (x, y coordinates in the top left, x, y coordinates in the bottom right). Also, the product region information 32b includes a class name unique to the product.

The interaction information 32c includes a probability value of the interaction between a user and a product detected from the image frame 31 and a class name of the interaction. A class name such as "held (user holds the product)" is set as the class name of the interaction.

The model information 143 according to the present embodiment outputs the detection information 32 only when the interaction is present between the user and the product. For example, when the image frame of a state in which the user is holding the product is input to the model information 143, the detection information 32 is output. On the other hand, when the image frame of a state in which the user is not holding any product is input to the model information 143, the detection information 32 is not output.

The data table 144 is a data table which is used to track the products detected from the image frames. FIG. 5 is a diagram illustrating an example of a data structure of the data table. As illustrated in FIG. 5, the data table 144 has a detection result table 144a, a being-tracked-object table 144b, and a tracking-stopped-object table 144c.

The detection result table 144a is a table which retains the coordinates of a product region output from the model information 143. In the following descriptions, the coordinates of the product region is described as "product region coordinates". The product region coordinates are represented by [first element, second element, third element, fourth element]. The first element represents an upper-left x coordinate of the product region. The second element represents an upper-left y coordinate of the product region. The third element represents a lower-right x coordinate of the product region. The fourth element represents a lower-right y coordinate of the product region.

The being-tracked-object table 144b is a table which retains information about the products which are being tracked. The being-tracked-object table 144b has identifications (IDs), the product region coordinates, lost counts, and stay counts. The IDs are identification information given to the product region coordinates. The product region coordinates represent coordinates of product regions.

The lost count represents the number of image frames counted when a state in which the product corresponding to the product region coordinates is no longer detected is obtained. The stay count represents the number of image frames counted when a state in which the product corresponding to the product region coordinates is no longer moving is obtained.

The tracking-stopped-object table 144c is a table which retains the information about the products for which tracking is stopped. The tracking-stopped-object table 144c has IDs, product region coordinates, and flags. The IDs are identification information given to the product region coordinates. The product region coordinates represent coordinates of product regions.

The flag is the information which represents whether the ID and the product region coordinates of the tracking-stopped-object table 144c is to be returned to the being-tracked-object table 144b or not. The flag set to "true" means that the ID and the product region coordinates of the record is to be returned to the being-tracked-object table 144b. The flag set to "false" means that the ID and the product region coordinates of the record is not to be returned to the being-tracked-object table 144b.

Descriptions return to those of FIG. 4. The determination table 145 is a table used to count the number of times of registering actions. In the present embodiment, when the product region coordinates specified from the image frame are moved from outside the scan region, which is set in advance, to inside the scan region, one is added to the number of times of registering actions. By using the determination table 145, the information processing device 100 is enabled to cause the number of times added to the number of times of registering actions to be one even when the same product is moved into/out from the scan region plural numbers of times.

FIG. 6 is a diagram illustrating an example of a data structure of the determination table. As illustrated in FIG. 6, the determination table 145 associates the IDs, previous frame positions, and counted flags. The IDs are identification information given to the product region coordinates. The previous frame position is the information which identifies whether the product region coordinates, which have been detected from a previous image frame, are inside or outside the scan region.

Herein, when the product region coordinates, which are the product region coordinates of the corresponding ID and have been detected from the previous image frame, are outside the scan region, "OUT" is set as the previous frame position. When the product region coordinates detected from the previous image frame are inside the scan region, "IN" is set as the previous frame position. The counted flag is a flag which identifies whether the process of adding one to the number of times of registering actions has been carried out or not regarding the corresponding ID.

In the present embodiment, "false" is set as an initial value of the counted flag. When the product region coordinates of the corresponding ID detected from a current image frame position becomes "IN" in a state in which the previous image frame position of the product region coordinates of the corresponding ID is set to "OUT", one is added to the number of times of registering actions. In this case, the counted flag is updated from "false" to "true".

The number-of-times-of-registering-actions information 146 has the information of the number of times of registering actions.

Descriptions return to those of FIG. 2. The control unit 150 has an acquisition unit 151, a tracking unit 152, a counting unit 153, and a determination unit 154. The control unit 150 is realized, for example, by a central processing unit (CPU) or a micro processing unit (MPU). Also, the control unit 150 may be executed by an integrated circuit such as an application specific integrated circuit (ASIC) or a field programmable gate array (FPGA).

The acquisition unit 151 acquires video data from the camera 30 and stores the acquired video data in the video buffer 141. The acquisition unit 151 acquires the product information 142 from the self-checkout machine 50 and stores the acquired product information 142 in the storage unit 140.

The tracking unit 152 tracks the product region coordinates based on the video data (image frames in time series) stored in the video buffer 141. For example, the tracking unit 152 repeatedly executes a process of sequentially inputting the image frames to the model information 143 to specify product region coordinates and updating the data table 144. Hereinafter, an example of a process of the tracking unit 152 will be described.

The tracking unit 152 inputs the image frames, which are stored in the video buffer 141, into the model information 143 and acquires the product region coordinates included in the detection information. The tracking unit 152 registers the product region coordinates in the detection result table 144a. In the following descriptions, the product region coordinates of the detection result table 144a are described as "first product region coordinates". The product region coordinates of the being-tracked-object table 144b are described as "second product region coordinates". The product region coordinates of the tracking-stopped-object table 144c are described as "third product region coordinates".

Note that the tracking unit 152 calculates "similarity degree" based on the distance between the centers of the product region coordinates serving as comparison targets. The shorter the distance between the centers of the product region coordinates serving as the comparison targets is, the larger the value of the similarity degree is. The relation between the distance between the centers and the similarity degree is assumed to be defined in advance.

The tracking unit 152 compares the first product region coordinates with each of the third product region coordinates of the tracking-stopped-object table 144c and determines whether there is a combination of the first product region coordinates and the third product region coordinates for which the similarity degree is equal to or higher than a threshold value Th1. The value of the threshold value Th1 is set in advance.

When the combination of the first product region coordinates and the third product region coordinates for which the similarity degree is equal to or higher than the threshold value Th1 is present, the tracking unit 152 executes the following process in the tracking-stopped-object table 144c. The tracking unit 152 sets, to "true", the flag of the entry having the third product region coordinates having the similarity degree with the first product region coordinates equal to or higher than the threshold value Th1. Also, the tracking unit 152 deletes, from the detection result table 144a, the entry having the first product region coordinates having the similarity degree with the third product region coordinates equal to or higher than the threshold value Th1.

The tracking unit 152 compares the first product region coordinates with each of the second product region coordinates of the being-tracked-object table 144b and specifies a maximum value of the similarity degree between the first product region coordinates and the second product region coordinates. When the maximum value of the similarity degree is equal to or higher than a threshold value Th3, the tracking unit 152 determines that "the corresponding product is not moving". When the maximum value of the similarity degree is less than the threshold value Th3 and equal to or higher than a threshold value Th2, the tracking unit 152 determines that "the corresponding product is trackable". When the maximum value is less than the threshold value Th2, the tracking unit 152 determines that "the corresponding product is not trackable". The values of the threshold values Th2 and Th3 are set in advance. However, the value of the threshold value Th3 is larger than the value of the threshold value Th2.

Figure 7:
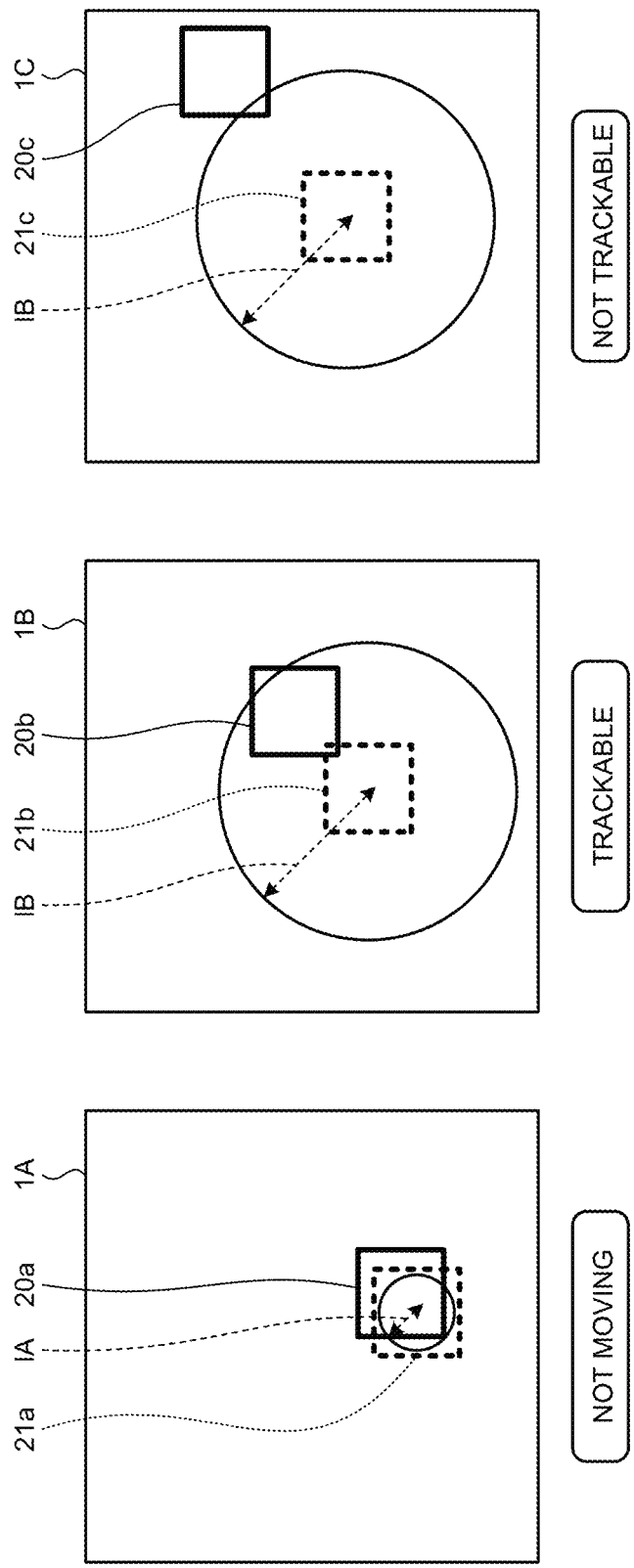
FIG. 7 is a diagram for describing a process of a tracking unit.

FIG. 7 is a diagram for describing a process of the tracking unit. In a case 1A of FIG. 7, the region of the product specified with the first product region coordinates is assumed to be a product region 20a, and the region of the product specified with the second product region coordinates is assumed to be a product region 21a. When the distance between the product region 20a and the product region 21a is less than a distance IA (when the similarity degree based on the distance is equal to or more than the threshold value Th3), the tracking unit 152 determines that "the corresponding product is not moving". When the tracking unit 152 determines that "the corresponding product is not moving", the tracking unit 152 adds one to the stay count in the entry corresponding to the product region 21a (second product region coordinates) of the being-tracked-object table 144b.

In a case 1B of FIG. 7, the region of the product specified with the first product region coordinates is assumed to be a product region 20b, and the region of the product specified with the second product region coordinates is assumed to be a product region 21b. When the distance between the product region 20b and the product region 21b is equal to or more than a distance 1A and less than 1B (when the similarity degree based on the distance is less than the threshold value Th3 and equal to or higher than the threshold value Th2), the tracking unit 152 determines that "the corresponding product is trackable".

When the tracking unit 152 determines that "the corresponding product is trackable", the tracking unit 152 updates the second product region coordinates to the first product region coordinates in the entry corresponding to the product region 21b (second product region coordinates) of the being-tracked-object table 144b. The tracking unit 152 sets the stay count to 0 in the entry corresponding to the product region 21b (second product region coordinates) of the being-tracked-object table 144b.

In a case 1C of FIG. 7, the region of the product specified with the first product region coordinates is assumed to be a product region 20c, and the region of the product specified with the second product region coordinates is assumed to be a product region 21c. When the distance between the product region 20c and the product region 21c is equal to or more than 1B (the similarity degree based on the distance is less than the threshold value Th2), the tracking unit 152 determines that "the corresponding product is not trackable".

When the tracking unit 152 determines that "the corresponding product is not trackable", the tracking unit 152 registers, in the being-tracked-object table 144b, a new entry of the first product region coordinates corresponding to the product region 20c. When the tracking unit 152 registers the new entry, the tracking unit 152 allocates a new ID, sets the stay count to 0, and sets the lost count to 0.

Herein, among the entries of the being-tracked-object table 144b, regarding the entry having the second product region coordinates having a similarity degree with the first product region coordinates not equal to or higher than the threshold value Th2, the tracking unit 152 adds one to the lost count.

The tracking unit 152 extracts the entry in which the lost counter has exceeded a threshold value Th4 among the entries of the being-tracked-object table 144b. Regarding the entries in which the value of the stay counter is equal to or higher than a threshold value Th5 among the extracted entries, the tracking unit 152 moves the corresponding entry (ID, the second product region coordinates) to the tracking-stopped-object table 144c and sets the flag to "false".

Regarding the entries in which the value of the stay counter is less than the threshold value Th5 among the extracted entries, the tracking unit 152 deletes the corresponding entries.

The tracking unit 152 moves the entry in which the flag is "true" among the entries of the tracking-stopped-object table 144c to the being-tracked-object table 144b and sets the stay counter to 0.

The tracking unit 152 repeatedly executes the above described process every time a new entry is registered in the detection result table 144a and updates the being-tracked-object table 144b and the tracking-stopped-object table 144c.

Descriptions return to those of FIG. 2. Based on the being-tracked-object table 144b of the data table 144, the counting unit 153 specifies the actions carried out by the user to register products with the self-checkout machine 50 and counts the number of times of registering actions with which the actions have been carried out. The counting unit 153 registers the number of times of registering actions in the storage unit 140 as the number-of-times-of-registering-actions information 146. Hereinafter, an example of the process of the counting unit 153 will be described.

Figure 8:
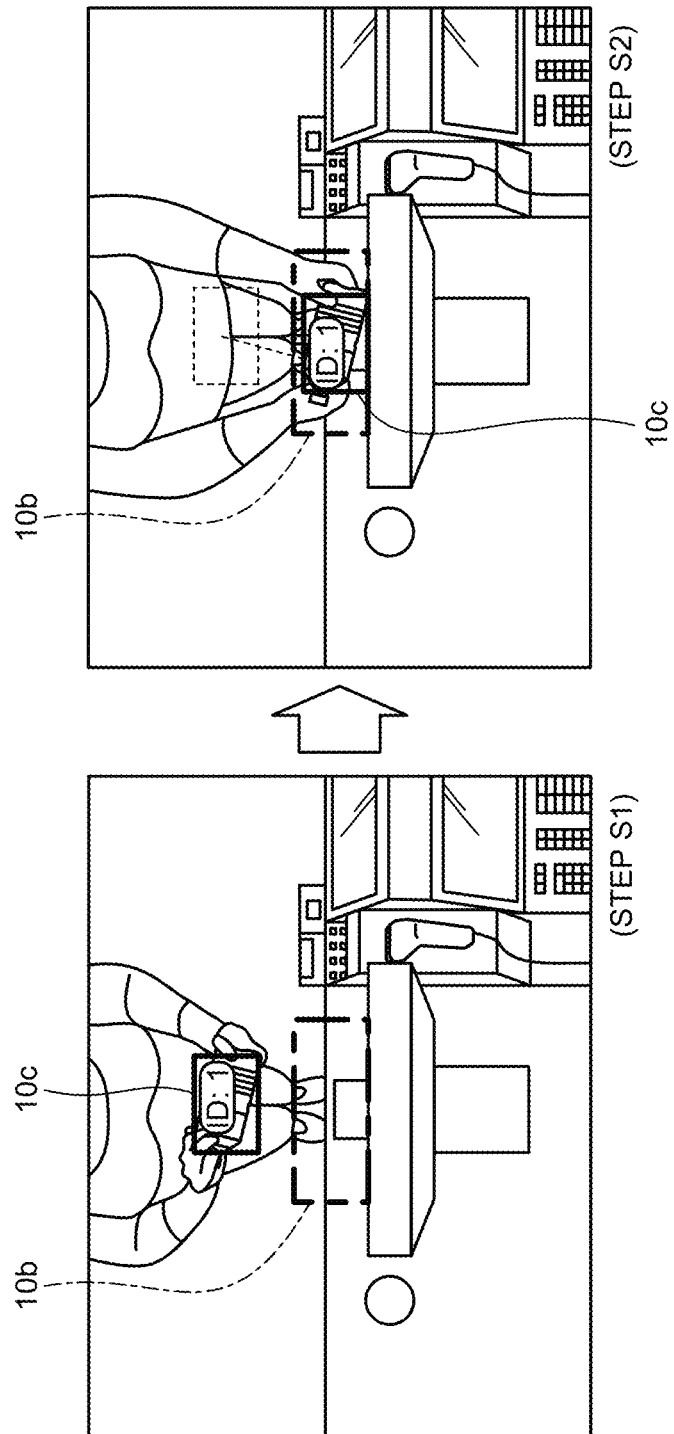
FIG. 8 is a diagram for describing a process of a counting unit.

FIG. 8 is a diagram for describing a process of the counting unit. Step S1 of FIG. 8 will be described. The counting unit 153 is assumed to retain the coordinates of the scan region 10b in advance. The counting unit 153 checks the being-tracked-object table 144b, and, when an entry of a new ID is added, the counting unit 153 adds an entry, in which the same ID as the new ID is set, to the determination table 145. When the counting unit 153 adds the entry to the determination table 145, the counting unit 153 sets the counted flag to "false". In the following descriptions, for explanatory convenience, the ID added to the determination table 145 will be described as ID "1". The ID given to the second product region coordinates corresponding to the region 10c of the product is assumed to be ID "1".

The counting unit 153 compares the second product region coordinates of the entry of the ID "1" of the being-tracked-object table 144b with the scan region 10b. When the second product region coordinates are not included in the scan region 10b, the counting unit 153 sets, to "OUT", the previous frame position of the entry of the ID "1" added to the determination table 145. When the second product region coordinates are included in the scan region 10b, the counting unit 153 sets, to "IN", the previous frame position of the entry of the ID "1" added to the determination table 145. In the example illustrated in step S1 of FIG. 8, since the region 10c of the product corresponding to the second product region coordinates is not included in the scan region 10b, the previous frame position of the entry of the ID "1" added to the determination table 145 is set to "OUT".

Step S2 of FIG. 8 will be described next. The counting unit 153 monitors the being-tracked-object table 144b and, every time the being-tracked-object table 144b is updated, compares the second product region coordinates corresponding to the ID "1" with the scan region 10b. When the second product region coordinates (the region 10c of the product) corresponding to the ID "1" is moved to the region included in the scan region 10b, the counting unit 153 checks the entry of the ID "1" of the determination table 145 and checks the previous frame position and the counted flag.

Regarding the entry of the ID "1" of the determination table 145, when the previous frame position is "OUT" and the counted flag is "false", the counting unit 153 adds one to the number of times of registering actions. Also, after one is added to the number of times of registering actions, the counting unit 153 updates the previous frame position to "IN" and updates the counted flag to "true".

On the other hand, when the previous frame position is "IN" or when the counted flag is "true", the counting unit 153 skips the process of adding one to the number of times of registering actions.

Every time the entry of a new ID is added to the being-tracked-object table 144b, the counting unit 153 repeatedly executes the above described process. When the same ID as the ID of the entry added to the being-tracked-object table 144b is the same as the ID of the entry registered in the determination table 145, the counting unit 153 skips the process of registering the entry, which is corresponding to the new ID, to the determination table 145.

The determination unit 154 notifies the administrator terminal 60 of an alert based on the product information 142 and the number-of-times-of-registering-actions information 146. Hereinafter, an example of the process of the determination unit 154 will be described. The determination unit 154 acquires the product information 142 and specifies the number of purchases. For example, the determination unit 154 specifies the number of the records having different time/date information of the product information 142 as the number of purchases.

If the number of purchases and the number of times of registering actions of the number-of-times-of-registering-actions information 146 are different from each other, the determination unit 154 transmits an alert to the administrator terminal 60. For example, since there is a possibility of a missed checkout when the number of purchases is smaller than the number of times of registering actions, the determination unit 154 notifies the administrator terminal 60 of the alert that a missed checkout has been detected when the number of purchases is smaller than the number of times of registering actions.

On the other hand, when the number of purchases and the number of times of registering actions of the number-of-times-of-registering-actions information 146 match, the determination unit 154 skips the alert notifying process.

Figure 9:
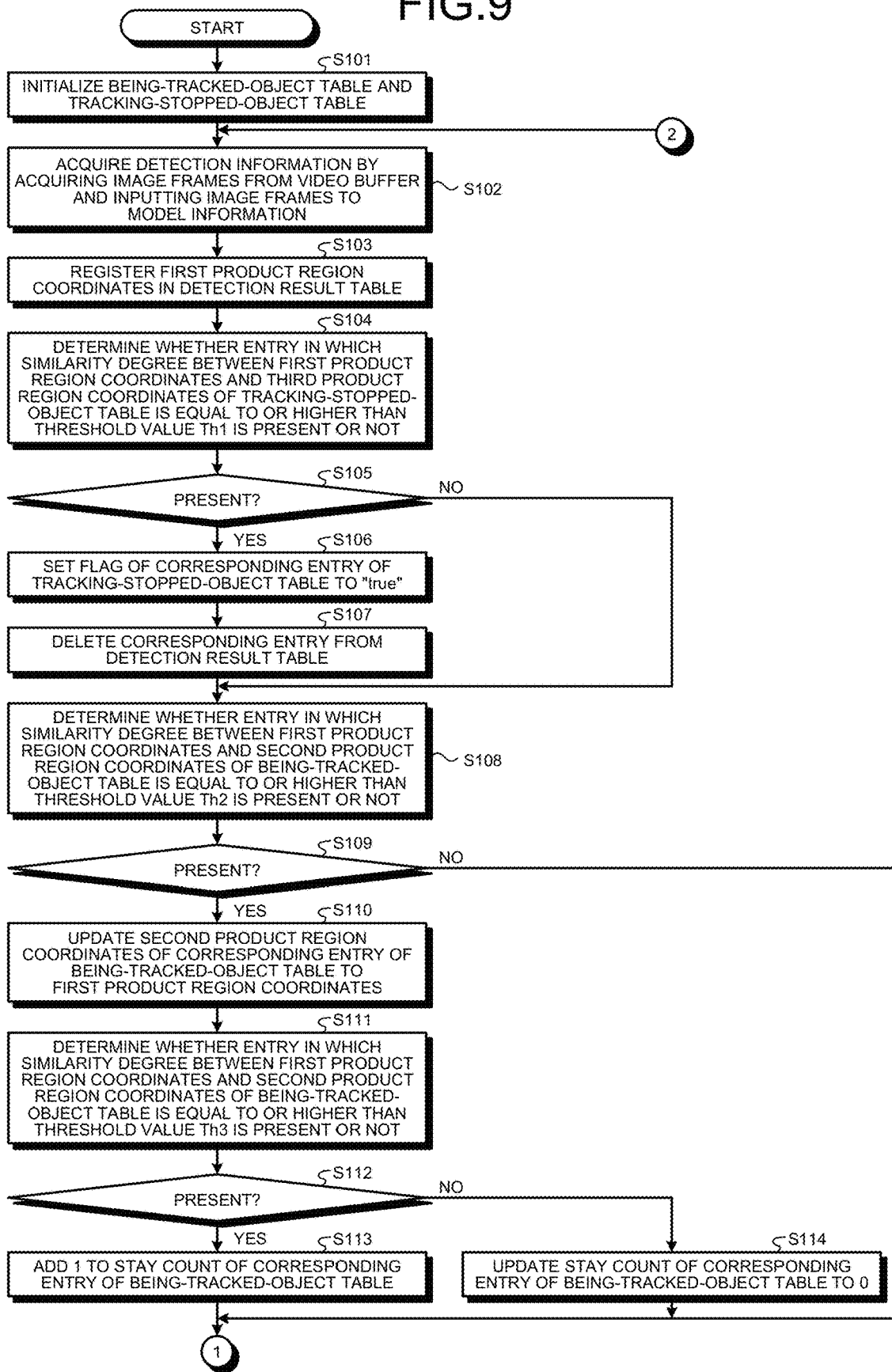
FIG. 9 is a flow chart (1) illustrating a processing procedure of a tracking process.
Figure 10:
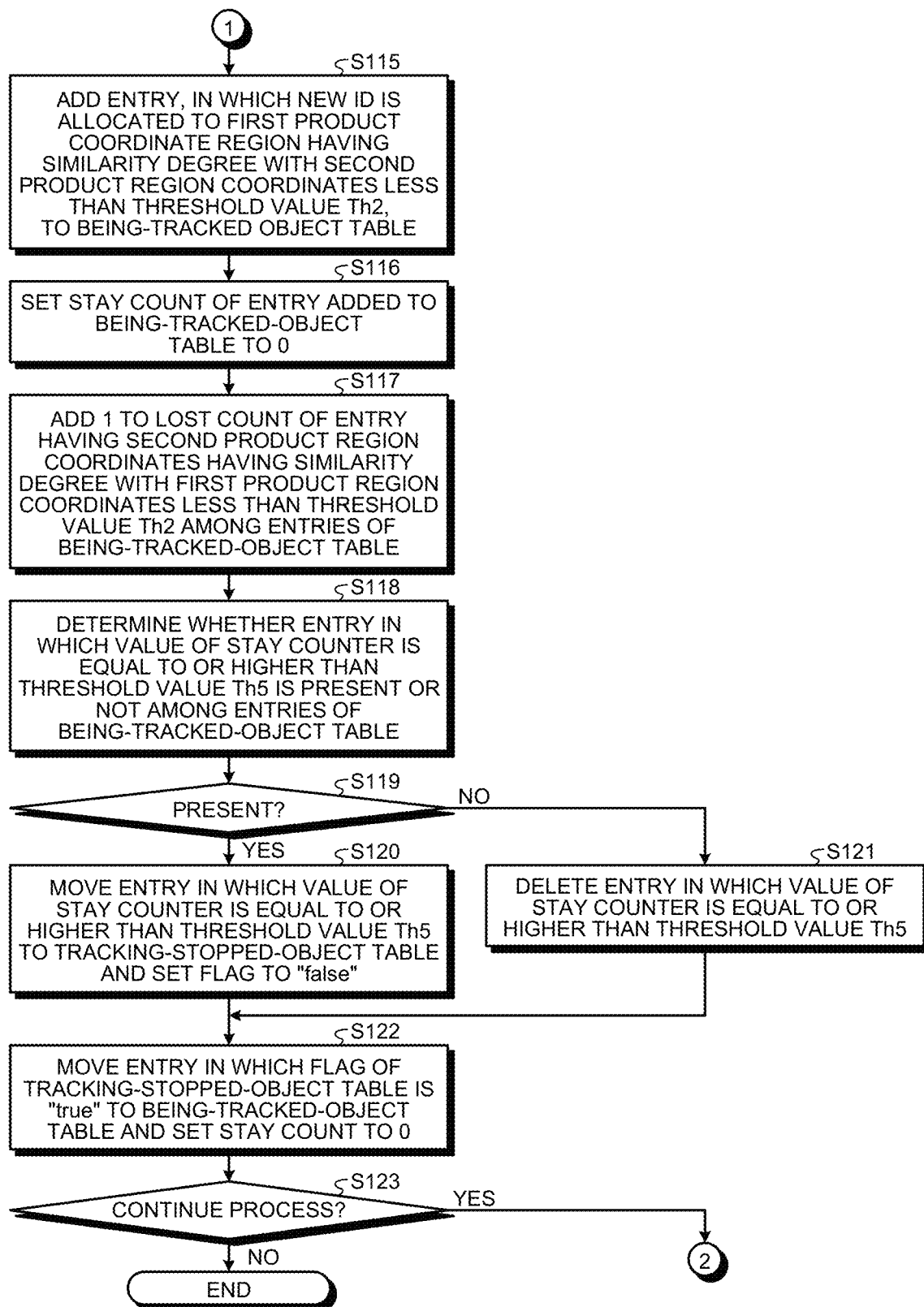
FIG. 10 is a flow chart (2) illustrating a processing procedure of the tracking process.

Next, an example of a tracking process executed by the tracking unit 152 of the information processing device 100 according to the present embodiment will be described. FIG. 9 and FIG. 10 are flow charts illustrating a processing procedure of the tracking process. As illustrated in FIG. 9, the tracking unit 152 of the information processing device 100 initializes the being-tracked-object table 144b and the tracking-stopped-object table 144c (step S101).

The tracking unit 152 acquires detection information by acquiring image frames from the video buffer 141 and inputting the image frames to the model information 143 (step S102). The tracking unit 152 registers the first product region coordinates, which are included in the detection information, to the detection result table 144a (step S103).

The tracking unit 152 determines whether an entry in which the similarity degree between the first product region coordinates and the third product region coordinates of the tracking-stopped-object table 144c is equal to or higher than the threshold value Th1 is present or not (step S104). When the entry is present (step S105, Yes), the tracking unit 152 makes a transition to step S106. On the other hand, when the entry is not present (step S105, No), the tracking unit 152 makes a transition to step S108.

The tracking unit 152 sets the flag of the corresponding entry of the tracking-stopped-object table 144c to "true" (step S106). The tracking unit 152 deletes the corresponding entry from the detection result table 144a (step S107).

The tracking unit 152 determines whether an entry in which the similarity degree between the first product region coordinates and the second product region coordinates of the being-tracked-object table 144b is equal to or higher than the threshold value Th2 is present or not (step S108). When the entry is present (step S109, Yes), the tracking unit 152 makes a transition to step S110. On the other hand, when the entry is not present (step S109, No), the tracking unit 152 makes a transition to step S115 of FIG. 10.

The tracking unit 152 updates the second product region coordinates of the corresponding entry of the being-tracked-object table 144b to the first product region coordinates (step S110). The tracking unit 152 determines whether an entry in which the similarity degree between the first product region coordinates and the second product region coordinates of the being-tracked-object table 144b is equal to or higher than the threshold value Th3 is present or not (step S111).

When the entry is present (step S112, Yes), the tracking unit 152 adds one to the stay count of the corresponding entry of the being-tracked-object table 144b (step S113) and makes a transition to step S115 of FIG. 10.

On the other hand, when the entry is not present (step S112, No), the tracking unit 152 updates the stay count of the corresponding entry of the being-tracked-object table 144b to 0 (step S114) and makes a transition to step S115 of FIG. 10.

FIG. 10 will be described next. The tracking unit 152 adds an entry, in which a new ID is allocated to the first product region information having a similarity degree with the second product region coordinates less than the threshold value Th2, to the being-tracked-object table 144b (step S115). The tracking unit 152 sets the stay count of the entry added to the being-tracked-object table 144b to 0 (step S116).

The tracking unit 152 adds one to the lost count of the entry having the second product region coordinates having the similarity degree with the first product region coordinates less than the threshold value Th2 among the entries of the being-tracked-object table 144b (step S117).

The tracking unit 152 determines whether an entry in which the value of the stay counter is equal to or higher than the threshold value Th5 is present or not among the entries of the being-tracked-object table 144b (step S118). When the entry is present (step S119, Yes), the tracking unit 152 makes a transition to step S121. On the other hand, when the entry is not present (step S119, No), the tracking unit 152 makes a transition to step S121. The tracking unit 152 moves the entry, in which the value of the stay counter is equal to or higher than the threshold value Th5, to the tracking-stopped-object table 144c and sets the flag to "false" (step S120). The tracking unit 152 moves the entry, in which the flag of the tracking-stopped-object table 144c is "true", to the being-tracked-object table 144b and sets the stay count thereof to 0 (step S122). Note that the tracking unit 152 deletes the entry, in which the value of the stay counter is equal to or higher than the threshold value Th5, (step S121) and makes a transition to step S122.

When the process is to be continued (step S123, Yes), the tracking unit 152 makes a transition to step S102 of FIG. 9. On the other hand, when the process is not to be continued (step S123, No), the tracking unit 152 terminates the process.

Figure 11:
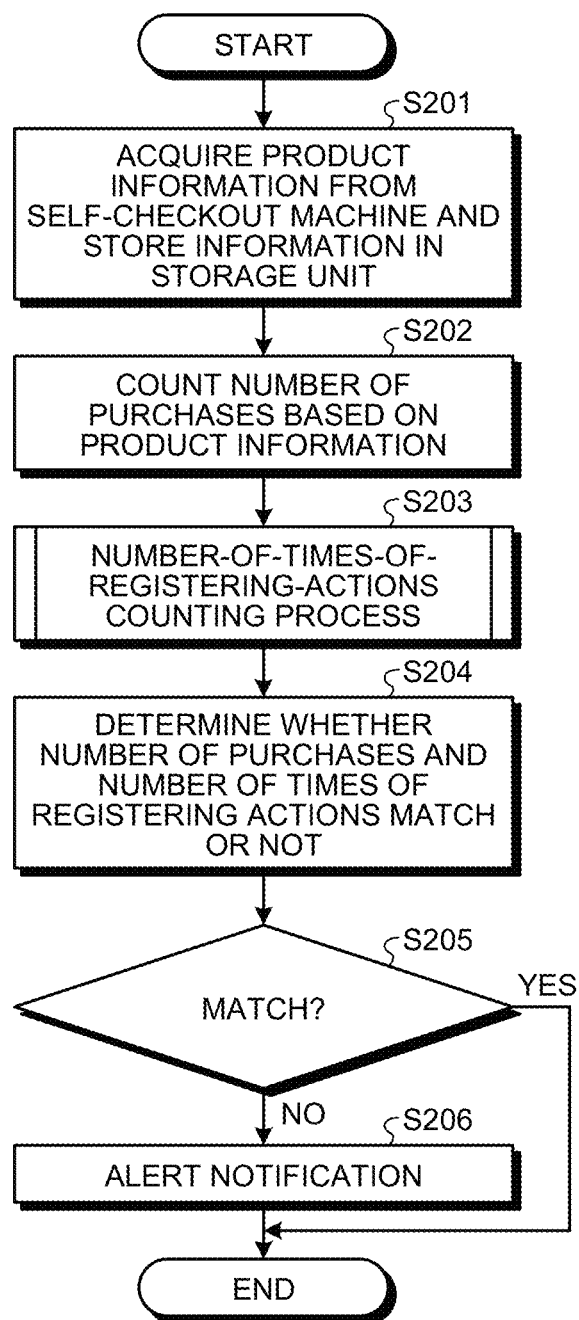
FIG. 11 is a flow chart illustrating a processing procedure of the information processing device according to the present embodiment.

Next, a processing procedure of the information processing device according to the present embodiment will be described. FIG. 11 is a flow chart illustrating the processing procedure of the information processing device according to the present embodiment. As illustrated in FIG. 11, the acquisition unit 151 of the information processing device 100 acquires the product information 142 from the self-checkout machine 50 and stores the information in the storage unit 140 (step S201).

The counting unit 153 of the information processing device 100 counts the number of purchases based on the product information (step S202). The counting unit 153 executes a number-of-times-of-registering-actions counting process (step S203).

The determination unit 154 of the information processing device 100 determines whether the number of purchases and the number of times of registering actions match or not (step S204). When the number of purchases and the number of times of registering actions match (step S205, Yes), the determination unit 154 terminates the process.

On the other hand, when the number of purchases and the number of times of registering actions do not match (step S205, No), the determination unit 154 notifies the administrator terminal 60 of an alert (step S206).

Figure 12:
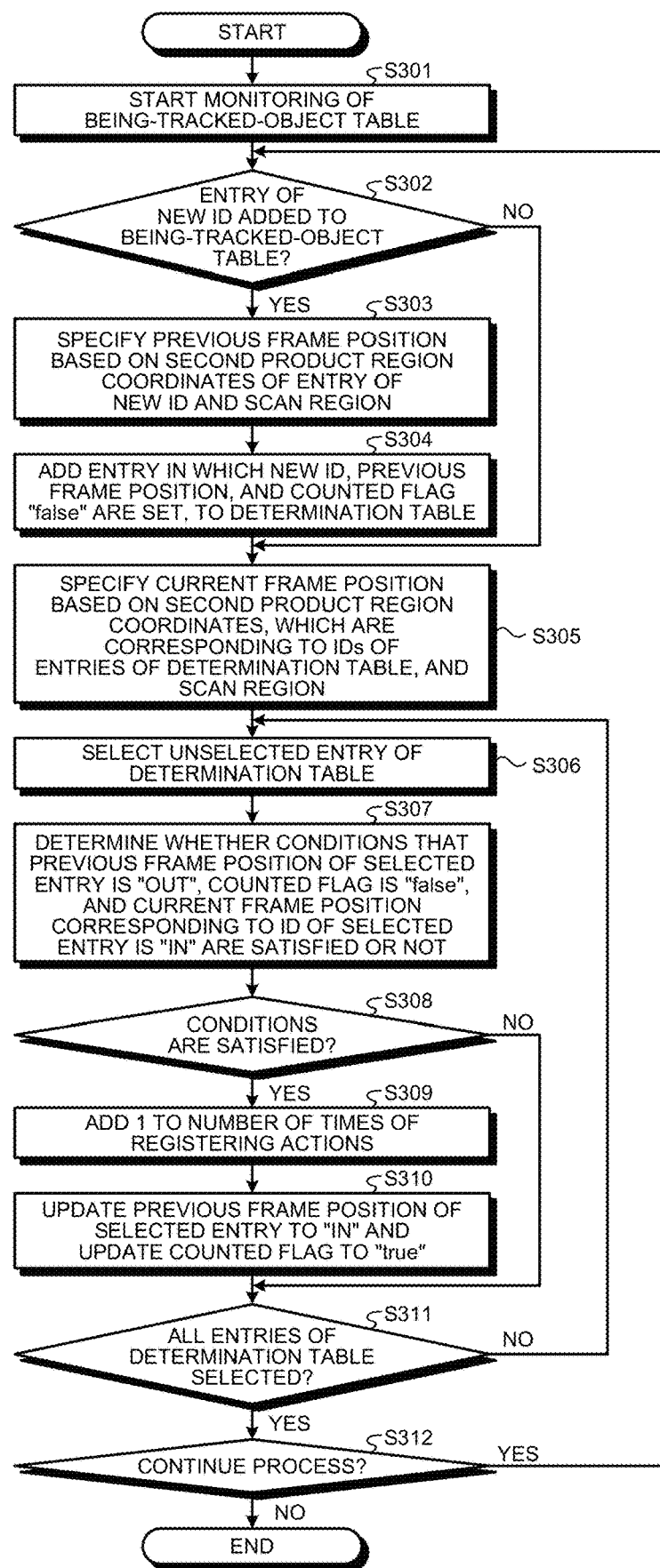
FIG. 12 is a flow chart illustrating a processing procedure of a number-of-times-of-registering-actions counting process.

Next, an example of a processing procedure of the number-of-times-of-registering-actions counting process described in step S203 of FIG. 11 will be described. FIG. 12 is a flow chart illustrating the processing procedure of the number-of-times-of-registering-actions counting process. As illustrated in FIG. 12, the counting unit 153 of the information processing device 100 starts monitoring of the being-tracked-object table 144b (step S301).

When an entry of a new ID is added to the being-tracked-object table 144b (step S302, Yes), the counting unit 153 makes a transition to step S303. When an entry of a new ID is not added to the being-tracked-object table 144b (step S302, No), the counting unit 153 makes a transition to step S305.

The counting unit 153 specifies the previous frame position based on the second product region coordinates of the entry of the new ID and based on the scan region (step S303). The counting unit 153 adds an entry, in which the new ID, the previous frame position, and the counted flag "false" are set, to the determination table 145 (step S304).

The counting unit 153 specifies a current frame position based on the second product region coordinates, which are corresponding to the IDs of the entries of the determination table 145, and the scan region (step S305). The counting unit 153 selects an unselected entry of the determination table 145 (step S306).

The counting unit 153 determines whether conditions that the previous frame position of the selected entry is "OUT", the counted flag is "false", and the current frame position corresponding to the ID of the selected entry corresponding to the ID is "IN" are satisfied or not (step S307).

When the conditions are satisfied (step S308, Yes), the counting unit 153 makes a transition to step S309. When the conditions are not satisfied (step S308, No), the counting unit 153 makes a transition to step S311.

The counting unit 153 adds one to the number of times of registering actions (step S309). The counting unit 153 updates the previous frame position of the selected entry to "IN" and updates the counted flag to "true" (step S310).

When all of the entries of the determination table 145 have not been selected (step S311, No), the counting unit 153 makes a transition to step S306. When all the entries of the determination table 145 have been selected (step S311, Yes), the counting unit 153 makes a transition to step S312.

When the process is to be continued (step S312, Yes), the counting unit 153 makes a transition to step S302. When the process is not to be continued (step S312, No), the counting unit 153 terminates the number-of-times-of-registering-actions counting process.

Next, effects of the information processing device 100 according to the present embodiment will be described. The information processing device 100 gives a notification of an alert based on the number of purchases, which is specified from the product information 142 acquired from the self-checkout machine 50, and the number of times of registering actions, which is counted by comparing the product regions with the scan region. For example, if the number of times of registering actions and the number of purchases are different from each other, it can be said that missed checkout of a product(s) has occurred. The information processing device 100 can detect missed checkout of products by giving a notification of an alert based on the number of times of registering actions and the number of purchase.

Incidentally, the processing contents of the above described embodiment are an example and the information processing device 100 may further execute another process (es). In the following descriptions, other processes executed by the information processing device 100 will be described.

Another process (1) executed by the information processing device 100 will be described. The counting unit 153 of the information processing device 100 has executed the process by using the scan region set in advance, but is not limited thereto. The counting unit 153 may analyze the image frames registered in the video buffer 141, specify a first area in which a shopping basket is disposed and a second area corresponding to the scan region, and count the number of times of registering actions by using the specified second area.

Figure 13:
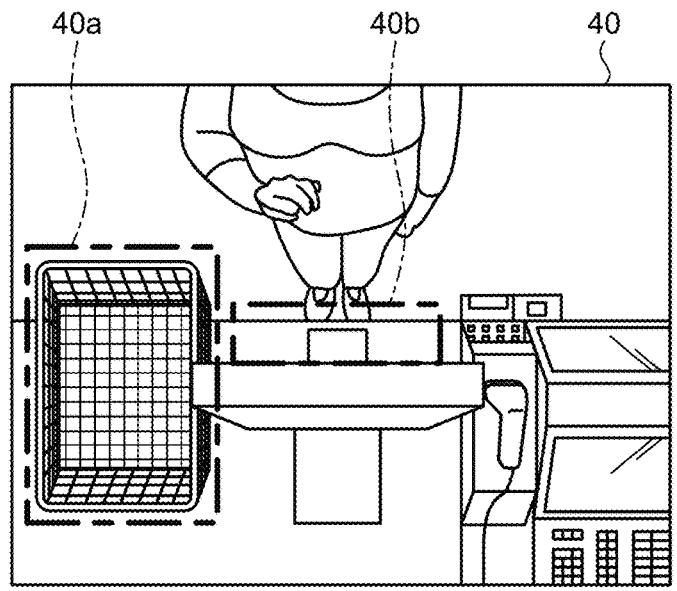
FIG. 13 is a diagram for describing another process (1)

FIG. 13 is a diagram for describing another process (1). In the example illustrated in FIG. 13, a first area 40a and a second area 40b are specified from an image frame 40. The counting unit 153 may specify the first area 40a and the second area 40b by using a conventional technique such as pattern matching or may specify the first area 40a and the second area 40b by using a machine-trained machine training model. For example, the machine training model is a model which has executed machine training by using teaching data, which uses the image frames as input and uses the coordinates of the first area and the second area as correct answer data.

In a case in which the self-checkout machine 50 is moved or the position of the camera 30 is changed while the counting unit 153 is executing the process, if the process is executed by using the scan region set in advance, the number of times of registering actions is not capable of being counted with high accuracy. On the other hand, the scan region can be precisely specified by analyzing the image frames registered in the video buffer 141 and specifying the second area corresponding to the scan region, and the number of times of registering actions can be counted with high accuracy.

Another process (2) executed by the information processing device 100 will be described. In the above described information processing device 100, the number of purchases has been counted based on the product information 142 acquired from the self-checkout machine 50, but is not limited thereto. When a checkout process is to be executed, the self-checkout machine 50 displays the number of purchases of products on a display screen. Therefore, the information processing device 100 may specify the number of purchases by executing image analysis with respect to an image frame of the display screen captured by the camera 30 (or another camera).

Figure 14:
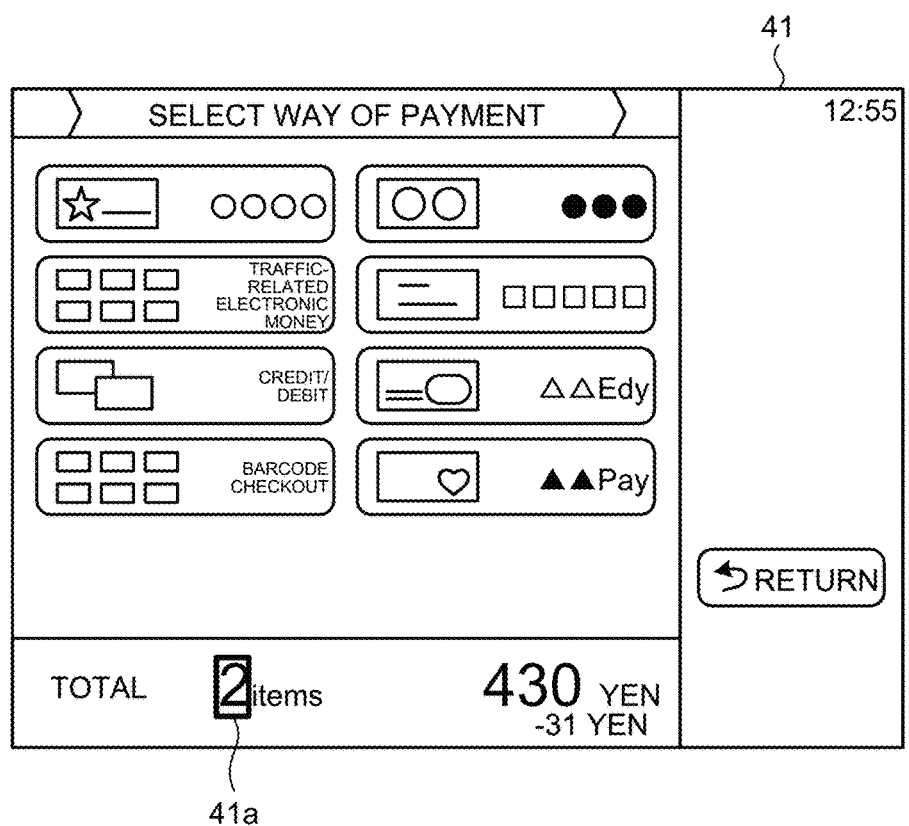
FIG. 14 is a diagram for describing another process (2)

FIG. 14 is a diagram for describing another process (2). An image frame 41 of FIG. 14 corresponds to the display screen of the self-checkout machine 50. The image frame 41 includes the region 41a representing the number of purchases of products. The counting unit 153 specifies the number of purchases by subjecting the region 41a to image analysis.

As described above, when the counting unit 153 analyzes the image frame of the display screen of the self-checkout machine 50 and specifies the number of purchases of products, the information processing device 100 can compare the number of times of registering actions with the number of purchases and give a notification of an alert even if the information processing device 100 is not connected to the self-checkout machine 50.

Figure 15:
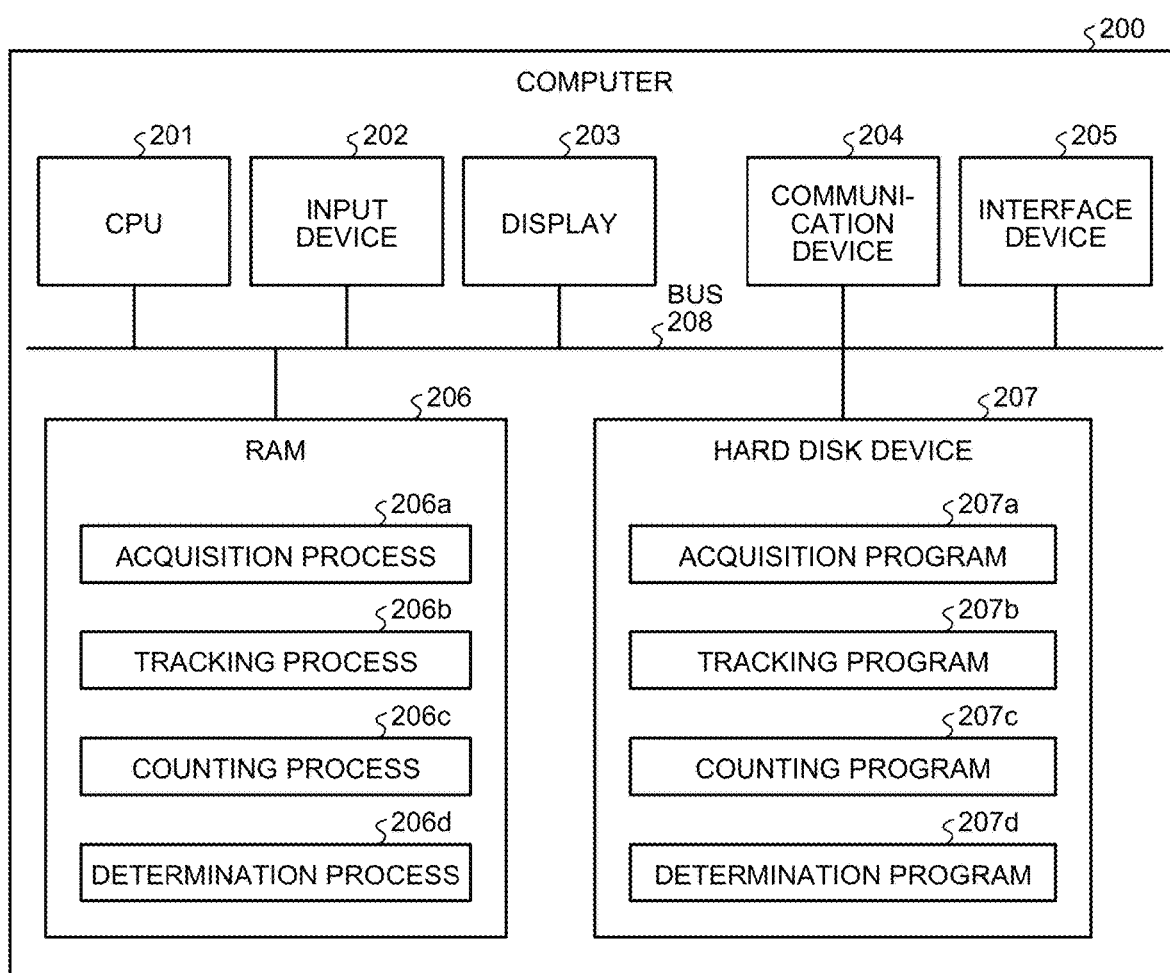
FIG. 15 is a diagram illustrating an example of a hardware configuration of a computer which realizes functions similar to those of the information processing device of the embodiment.

Next, an example of a hardware configuration of a computer which realizes functions similar to those of the information processing device 100 described in the above described embodiment will be described. FIG. 15 is a diagram illustrating an example of a hardware configuration of a computer which realizes functions similar to those of the information processing device of the embodiment. Note that, in the present embodiment, descriptions have been given by using barcodes. However, Quick Response (QR) codes or the like may be used.

As illustrated in FIG. 15, a computer 200 has a CPU 201 which executes various arithmetic processing, an input device 202 which receives input of data from a user, and a display 203. Moreover, the computer 200 has a communication device 204, which transfers data between the camera 30, an external device, etc. via a wired or wireless network, and an interface device 205. Moreover, the computer 200 has a RAM 206, which temporarily stores various information, and a hard disk device 207. The devices 201 to 207 are connected to a bus 208.

The hard disk device 207 has an acquisition program 207a, a tracking program 207b, a counting program 207c, and a determination program 207d. The CPU 201 reads the programs 207a to 207d and deploys the programs in the RAM 206.

The acquisition program 207a functions as an acquisition process 206a. The tracking program 207b functions as a tracking process 206b. The counting program 207c functions as a counting process 206c. The determination program 207d functions as a determination process 206d.

The process of the acquisition process 206a corresponds to the process of the acquisition unit 151. The process of the tracking process 206b corresponds to the process of the tracking unit 152. The process of the counting process 206c corresponds to the process of the counting unit 153. The process of the determination process 206d corresponds to the process of the determination unit 154.

Note that the programs 207a to 207d do not necessarily have to be stored in the hard disk device 207 from the beginning. For example, the programs are stored in a "portable physical medium" such as a flexible disk (FD), a CD-ROM, a DVD, a magnetooptical disk, an IC card, or the like which is to be inserted into the computer 200. The computer 200 may read and execute the programs 207a to 207d.

Figure 16:
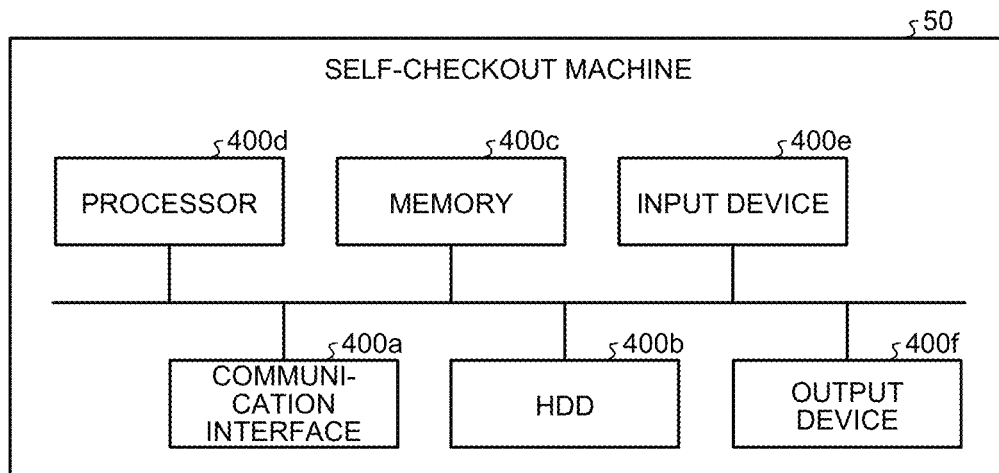
FIG. 16 is a diagram illustrating a hardware configuration example of a self-checkout machine.
Figure 17:
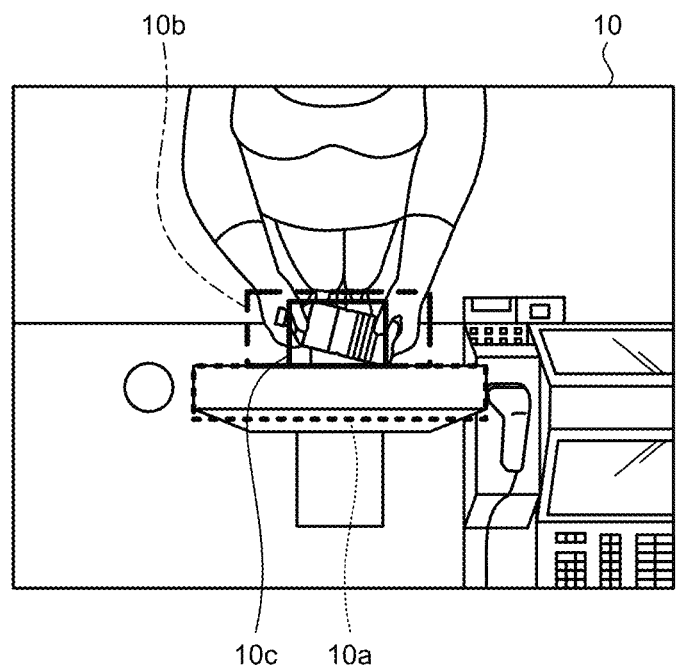
FIG. 17 is a diagram for describing a conventional technique.

FIG. 16 is a diagram illustrating a hardware configuration example of the self-checkout machine 50. As illustrated in FIG. 16, the self-checkout machine 50 has a communication interface 400a, a HDD 400b, a memory 400c, a processor 400d, an input device 400e, and an output device 400f. Also, the units illustrated in FIG. 17 are mutually connected via a bus or the like.

The communication interface 400a is a network interface card or the like and carries out communication with another information processing device. The HDD 400b stores programs and data which causes the functions of the self-checkout machine 50 to work.

The processor 400d is a hardware circuit which causes the processes of executing the functions of the self-checkout machine 50 to work by reading programs, which execute the processes of the functions of the self-checkout machine 50, from the HDD 400b or the like and deploying the programs in the memory 400c. In other words, these processes execute the functions similar to the processing units of the self-checkout machine 50.

In this manner, the self-checkout machine 50 works as an information processing device which executes action control processes by reading and executing the programs which execute the processes of the functions of the self-checkout machine 50. The self-checkout machine 50 can also realize the functions of the self-checkout machine 50 by reading a program(s) from a recording medium by a medium reading device and executing the read program. Note that the programs referred to in this another embodiment are not limited to those executed by the self-checkout machine 50. For example, the present embodiment may be similarly applied also in a case in which another computer or a server executes the program or in a case in which they work together to execute the program.

Also, the program which executes the processes of the functions of the self-checkout machine 50 can be distributed via a network such as the Internet. Also, the program can be recorded in a computer-readable recording medium such as a hard disk, a FD, a CD-ROM, a MO, a DVD, or the like and can be executed when the program is read from the recording medium by a computer.

The input device 400e detects various input operations made by a user such as input operations with respect to the program executed by the processor 400d. The input operations include, for example, touch operations, etc. In a case of the touch operations, the self-checkout machine 50 may be further provided with a display unit, and the input operations detected by the input device 400e may be the touch operations with respect to the display unit. The input device 400e may be, for example, buttons, a touch screen, a proximity sensor, etc. Also, the input device 400e reads barcodes. The input device 400e is, for example, a barcode reader. The barcode reader has an optical source and an optical sensor and scans barcodes.

The output device 400f outputs data, which is output from the program executed by the processor 400d, via an external device connected to the self-checkout machine 50 such as an external display device. Note that, when the self-checkout machine 50 is provided with a display unit, the self-checkout machine 50 does not have to be provided with the output device 400f.

The missed checkout of the product(s) can be detected.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process comprising:
    acquiring product information registered on a specific machine which reads a code of a product;
        identifying a first number of products registered on the specific machine based on the acquired product information;
        acquiring, from a neural network that inputs an image capturing a user in front of the specific machine and outputs, when there is an interaction between a product and the user, detection information indicating an area where including product region information representing a region of the product held by the user by coordinates, the output detection information;
        specifying an action of the user of moving the product to a scan region of the specific machine to register the product to the specific machine based on the product region information included in the output detection information and the scan region wherein the scan region is specified from the image and is where the code of the product held by the user is read by the specific machine;
        identifying a second number of times of carrying out the action; and
        generating an alert based on the first number and the second number.

2. The non-transitory computer-readable recording medium according to claim 1, wherein the generating gives a notification, by the alert, that the user has not paid for the product based on a difference between the first number and the second number.

3. The non-transitory computer-readable recording medium according to claim 1, wherein the acquiring acquires the product information recorded in a memory device of a payment machine as the specific machine when the payment machine reads the code of the product.

4. The non-transitory computer-readable recording medium according to claim 1, wherein the acquiring acquires the product information based on image information displayed on a display screen of a payment machine as the specific machine when the payment machine reads the code of the product.

5. A notification method executed by a computer, the notification method comprising:
    acquiring product information registered on a specific machine which reads a code of a product;
    identifying a first number of products registered on the specific machine based on the acquired product information;
    acquiring, from a neural network that inputs an image capturing a user in front of the specific machine and outputs, when there is an interaction between a product and the user, detection information including product region information representing a region of the product held by the user by coordinates, the output detection information;
    specifying an action of the user of moving the product to a scan region of the specific machine to register the product to the specific machine based on the product region information included in the output detection information and the scan region wherein the scan region is specified from the image and is where the code of the product held by the user is read by the specific machine;
    identifying a second number of times of carrying out the action; and
    generating an alert based on the first number and the second number.

6. The notification method according to claim 5, wherein the generating gives a notification, by the alert, that the user has not paid for the product based on a difference between the first number and the second number.

7. The notification method according to claim 5, wherein the acquiring acquires the product information recorded in a memory device of a payment machine as the specific machine when the payment machine reads the code of the product.

8. The notification method according to claim 5, wherein the acquiring acquires the product information based on image information displayed on a display screen of a payment machine as the specific machine when the payment machine reads the code of the product.

9. An information processing device, comprising:
    a memory; and
    a processor coupled to the memory and the processor configured to:

acquire product information registered on a specific machine which reads a code of a product;

identify a first number of products registered on the specific machine based on the acquired product information;

acquire, from a neural network that inputs an image capturing a user in front of the specific machine and outputs, when there is an interaction between a product and the user, detection information including product region information representing a region of the product held by the user by coordinates, the output detection information;

specify an action of the user of moving the product to a scan region of the specific machine to register the product to the specific machine based on the product region information included in the output detection information and the scan region wherein the scan region is specified from the image and is where the code of the product held by the user is read by the specific machine;

identify a second number of times of carrying out the action; and generate an alert based on the first number and the second number.

10. The information processing device according to claim 9, the processor further configured to give a notification, by the alert, that the user has not paid for the product based on a difference between the first number and the second number.

11. The information processing device according to claim 9, the processor further configured to acquire the product information, saved in a memory device of a payment machine as the specific machine when the payment machine reads the code of the product.

12. The information processing device according to claim 9, the processor further configured to acquire the product information based on image information displayed on a display screen of a payment machine as the specific machine when the payment machine reads the code of the product.

* * * * *